(12) United States Patent
Hood et al.

(10) Patent No.: US 8,806,935 B2
(45) Date of Patent: Aug. 19, 2014

(54) SNAP-FIT MEASURING CONTAINER

(75) Inventors: Lance Hood, Seattle, WA (US);
Jennifer K. Cotter, Seattle, WA (US);
Justin Bagley, Seattle, WA (US)

(73) Assignee: Progressive International Corporation, Kent, WA (US)

( * ) Notice: Subject to any disclaimer, the term of this patent is extended or adjusted under 35 U.S.C. 154(b) by 398 days.

(21) Appl. No.: 13/023,252

(22) Filed: Feb. 8, 2011

(65) Prior Publication Data

US 2012/0198930 A1    Aug. 9, 2012

(51) Int. Cl.
*G01F 19/00* (2006.01)

(52) U.S. Cl.
CPC ................................ *G01F 19/002* (2013.01)
USPC .............................................. 73/429; 73/426

(58) Field of Classification Search
CPC .......... A44B 17/00; B01L 3/00; G01G 19/56; G01F 19/00; A47J 43/28; B65D 69/00
USPC ............................................................ 73/429
See application file for complete search history.

(56) References Cited

U.S. PATENT DOCUMENTS

| 153,159 | A | | 7/1874 | Dinwiddie | |
|---|---|---|---|---|---|
| 423,018 | A | | 3/1890 | Young | |
| 1,228,373 | A | | 5/1917 | Kristofek | |
| 2,165,045 | A | * | 7/1939 | Garside | 73/426 |
| D156,850 | S | | 1/1950 | Shirley | |
| 2,654,252 | A | | 10/1953 | Davis | |
| 2,758,771 | A | | 8/1956 | Bauer | |
| D197,025 | S | | 12/1963 | Marcus | |
| D200,920 | S | | 4/1965 | Surratt | |
| 3,220,544 | A | | 11/1965 | Lovell | |
| 3,285,459 | A | | 11/1966 | Gahm | |
| D207,116 | S | | 3/1967 | Phillips | |
| D211,047 | S | | 5/1968 | Johnson | |
| 3,400,591 | A | | 9/1968 | Larson | |
| 3,490,290 | A | | 1/1970 | Bilson | |
| 3,526,138 | A | | 9/1970 | Swett et al. | |
| D224,778 | S | | 9/1972 | Cocci | |
| 2,099,430 | A | | 11/1973 | Quea | |

(Continued)

FOREIGN PATENT DOCUMENTS

| CA | 111366 | 10/2006 | | |
|---|---|---|---|---|
| EP | 746997 A1 | * 12/1996 | ................ | A47J 9/00 |

(Continued)

OTHER PUBLICATIONS

Merriam-Webster's Collegiate Dictionary, 10th Edition (2001).

*Primary Examiner* — Lisa Caputo
*Assistant Examiner* — Roger Hernandez-Prewit
(74) *Attorney, Agent, or Firm* — Lowe Graham Jones PLLC

(57) ABSTRACT

One or more measuring cups or spoons include a handle and a measuring container. The measuring container is formed with a volumetric capacity such as a fraction of a cup, a teaspoon, or a tablespoon. The handle of a first measuring container includes a feature that interacts with a complementary feature on the handle of a second measuring cup to secure the first and second cups together. In one version, a downwardly extending rib on the handle of a first measuring container is received within a channel formed on the handle of a second measuring container. A set of containers is formed in which each of the containers has an attachment feature allowing the set to be attached together.

11 Claims, 3 Drawing Sheets

(56) References Cited

U.S. PATENT DOCUMENTS

| | | |
|---|---|---|
| 3,795,062 A | 3/1974 | Lamb |
| 3,931,741 A | 1/1976 | Ceccarelli |
| D247,412 S | 3/1978 | Montesi |
| D257,549 S | 11/1980 | Chapman |
| D268,158 S | 3/1983 | Doyel |
| 4,377,191 A | 3/1983 | Yamaguchi |
| 4,416,381 A | 11/1983 | Swartwout |
| D294,213 S | 2/1988 | Chasen |
| D302,920 S | 8/1989 | Ancona et al. |
| D306,324 S | 2/1990 | Dykes |
| D309,116 S | 7/1990 | Marshall |
| D321,328 S | 11/1991 | Duquet |
| D332,579 S | 1/1993 | Goldman |
| 5,235,853 A | 8/1993 | Froes |
| D344,686 S | 3/1994 | Weterrings |
| 5,347,865 A | 9/1994 | Mulry et al. |
| 5,419,454 A | 5/1995 | Stowell et al. |
| 5,439,128 A | 8/1995 | Fishman |
| 5,575,398 A | 11/1996 | Robbins, III |
| D396,011 S | 7/1998 | Henriksson |
| 5,797,507 A * | 8/1998 | Kramer ............... 220/4.23 |
| 5,845,403 A * | 12/1998 | Nivin ............... 30/147 |
| D403,600 S | 1/1999 | Conforti et al. |
| D404,663 S | 1/1999 | Prindle |
| 5,918,922 A | 7/1999 | Lathrop et al. |
| D412,448 S | 8/1999 | Bentson |
| D418,068 S | 12/1999 | Robbins, III |
| 6,116,772 A | 9/2000 | DiGiacomo et al. |
| D437,793 S * | 2/2001 | Kaposi et al. ............... D10/46.2 |
| D438,125 S | 2/2001 | Kaposi et al. |
| D443,836 S | 6/2001 | Wright |
| 6,263,732 B1 | 7/2001 | Hoeting et al. |
| D450,605 S | 11/2001 | Wright |
| D451,828 S | 12/2001 | McGuyer |
| 6,490,964 B2 | 12/2002 | Buynacek |
| 6,543,284 B2 | 4/2003 | Hoeting et al. |
| 6,561,414 B1 | 5/2003 | Cai |
| D480,318 S | 10/2003 | Settele |
| D484,425 S | 12/2003 | Settele |
| 6,666,329 B1 | 12/2003 | Charbonneau |
| D486,745 S | 2/2004 | Mastroianni |
| D494,877 S | 8/2004 | Kempe et al. |
| D514,458 S | 2/2006 | Lawson et al. |
| D518,391 S | 4/2006 | McGuyer |
| D518,392 S | 4/2006 | Kaposi |
| D522,313 S | 6/2006 | Oyler et al. |
| D530,632 S | 10/2006 | Kaposi |
| D532,321 S | 11/2006 | Heiligenstein et al. |
| D536,222 S * | 2/2007 | Heiberg et al. ............... D7/645 |
| D544,378 S | 6/2007 | Curtin |
| D548,116 S | 8/2007 | Curtin |
| 7,282,532 B2 | 10/2007 | Akbar et al. |
| D558,539 S | 1/2008 | Curtin |
| D580,799 S | 11/2008 | Curtin |
| D588,947 S | 3/2009 | Curtin |
| 7,716,842 B2 * | 5/2010 | Sumner-Trivisani et al. .. 30/324 |
| 7,753,206 B2 * | 7/2010 | Sawhney et al. ............... 206/514 |
| 2004/0249059 A1 | 12/2004 | Akbar et al. |
| 2005/0127073 A1 | 6/2005 | Kusuma et al. |

FOREIGN PATENT DOCUMENTS

| | | |
|---|---|---|
| EP | 377502-0001 | 9/2005 |
| JP | 20006972 | 1/2000 |
| RU | 2059399 | 5/1996 |

* cited by examiner

SNAP-FIT MEASURING CONTAINER

FIELD OF THE INVENTION

The present invention relates to measuring cups and measuring spoons.

BACKGROUND OF THE INVENTION

Measuring cups and measuring spoons are commonly provided in a set in which an array of differently-sized cups or spoons are provided. The cups or spoons are typically stackable for more compact storage. Though stackable, they are not held in place and tend to separate from one another readily upon opening a drawer in which they are stored.

Measuring spoons are sometimes configured with a ring that permanently connects the array of spoons together. Though this ensures that each of the spoons can be readily located together with the others, it can be cumbersome and requires the user to hold all of the spoons together in use. It also requires all of them to be washed together, even if otherwise unnecessary for some of the spoons.

SUMMARY OF THE INVENTION

The present invention includes a measuring cup or spoon having a handle and a measuring container. The handle of a first measuring cup includes a feature that interacts with a complementary feature on the handle of a second measuring cup to secure the first and second cups together.

In a preferred version of the invention, a rib extends downward from the handle of the first cup and is received within a channel formed in the handle of the second cup. The rib and channel are sized such that the two cups are frictionally held together.

In some versions, a set of several measuring cups is provided in which each one of the cups includes a handle having a similar fastening feature.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
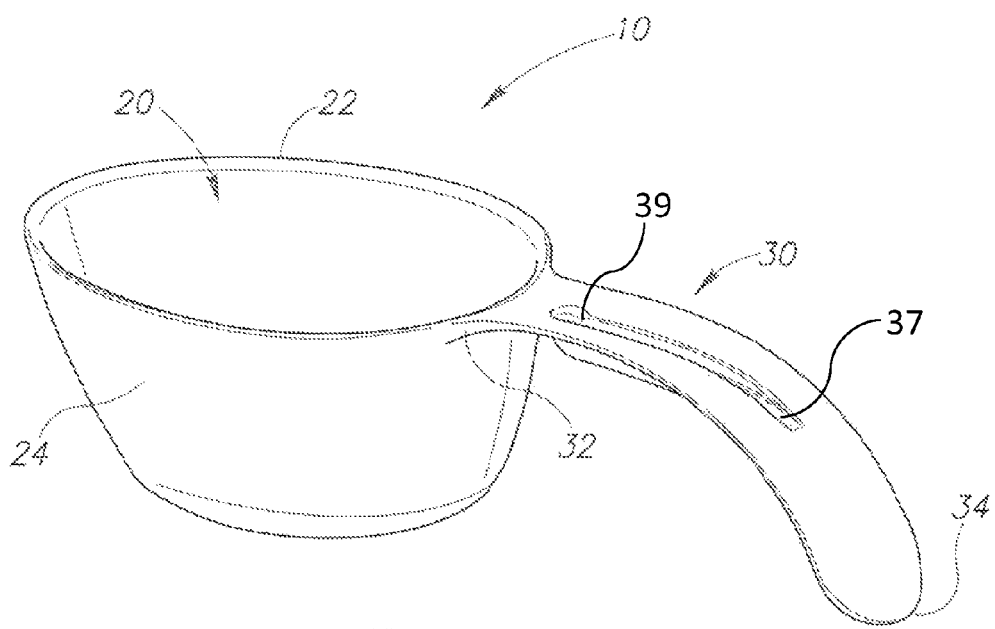
FIG. 1 is a top perspective view of a preferred measuring cup.
Figure 5:
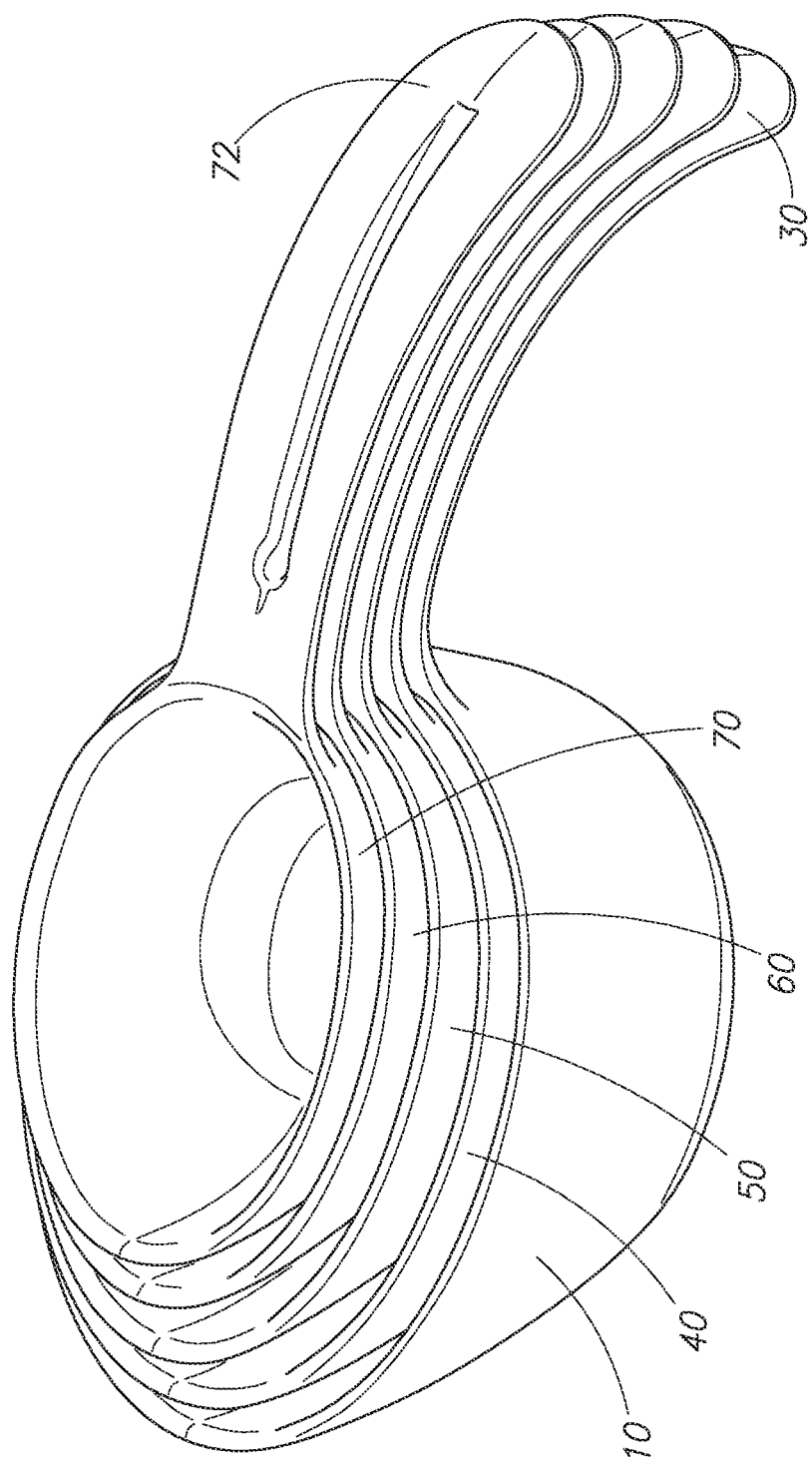
FIG. 5 is a top perspective view of a preferred set of measuring cups, shown nested together.

A preferred measuring container 10 includes a measuring vessel 20 and a handle 30. In the particular version as illustrated in FIG. 1, the measuring vessel is in the form of a measuring cup. As shown, the measuring vessel has a nominal or predetermined volume such as ¾ cup. As seen in FIG. 5, measuring cups of other sizes may also be formed in accordance with the invention, including for example cups having vessels with volumes of ¼ cup, ⅓ cup, ¼ cup, ⅔ cup, or other particular volumes.

The same principles of the invention are also applicable to measuring devices having smaller measuring vessels, such as measuring spoons. Thus, for example, the measuring spoons may have volumes such as ⅛ teaspoon, ¼ teaspoon, ¼ teaspoon, 1 teaspoon, 1 tablespoon, or other volumes.

The preferred vessel 20 includes a floor having sidewalls 24 extending upward and terminating in a rim 22. Most preferably the floor is substantially flat along at least a portion of its surface, though the bottom portion of the vessel may have any shape. As noted above, the vessel preferably is formed with a known volume in order to serve as a measuring cup or spoon. The vessel may, however, have an indeterminate or less precise volume.

The vessel includes a handle 30 extending laterally away from the vessel. Most preferably a proximal end 32 of the handle is attached to the vessel substantially at the rim 22 of the vessel, though the handle may alternatively be secured to the vessel at a different location such as along the sidewalls at a location below the rim. The handle extends laterally away from the vessel, terminating in a distal end 34 of the handle.

Figure 2:
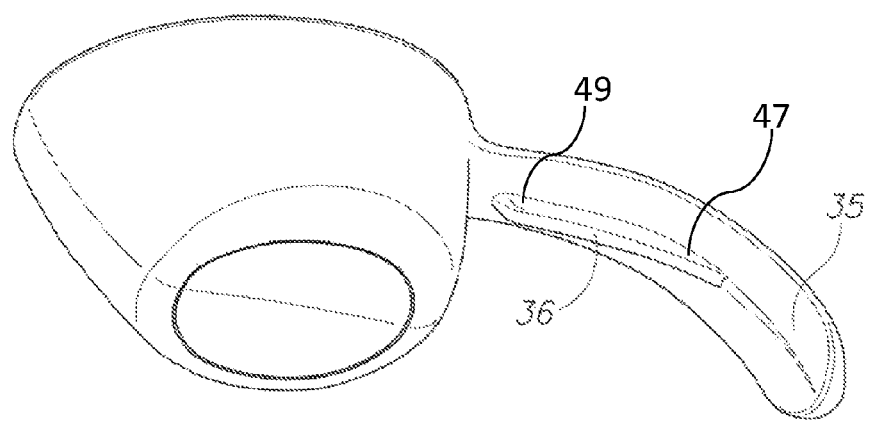
FIG. 2 is a bottom perspective view of a preferred measuring cup.

As best seen in FIG. 2, the handle includes a feature for connecting the handle of a first cup to the handle of a second cup having a mating feature. In the version as illustrated, the lower side 35 of the handle includes a downwardly-depending rib 36. The rib projects substantially vertically downward from the handle, in a direction substantially perpendicular to the lower side of the handle.

Most preferably, the rib 36 is elongated, having a length (in the direction from the proximal end of the handle toward the distal end of the handle) that is much greater than the width of the rib. In the version as shown, the length of the rib is approximately half the length of the handle. In other versions, the rib may be much smaller, such as ⅓ or ¼ of the length of the handle. In alternate versions, the rib may be longer and may extend along the entire length of the handle.

As shown, the rib extends in a direction that is generally parallel with the direction of the handle. In other words, the longest side of the rib is one that extends in a direction from the proximal end of the handle toward the distal end of the handle. In other versions, the rib may be substantially square in cross-section, having a length and width that are equal. In yet other versions, the rib may be wider than it is long, therefore being formed in a way that is generally perpendicular to the version as illustrated. The lateral rib as illustrated is preferred however, in part because it allows for a long rib with a large surface area of contact between the rib and mating surface of another measuring device, thereby providing a stronger connection between two devices. At the same time, the nature of the rib and the handles allows a user to separate them from one another readily, as described further below.

Figure 3:
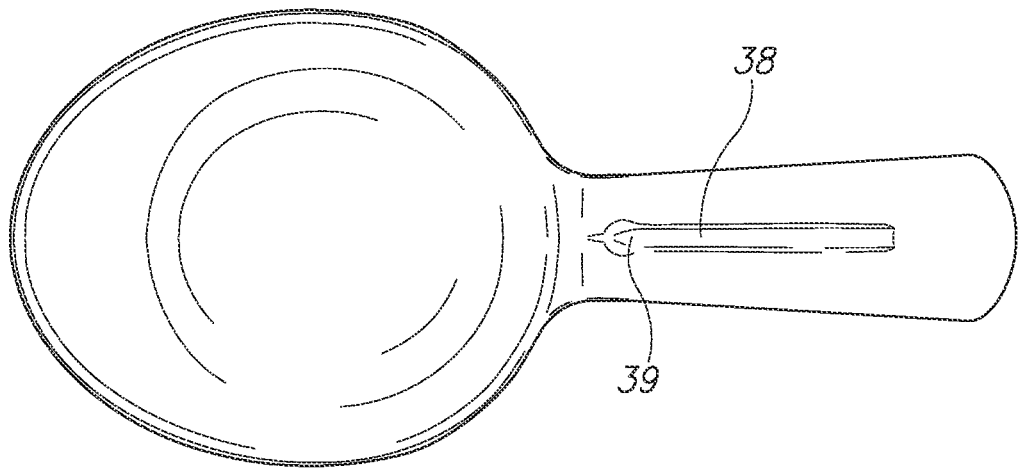
FIG. 3 is a top plan view of a preferred measuring cup.

As best seen in FIG. 3, an upper surface of the handle includes a channel 38. The channel is formed to receive the rib 36 of a mating measuring cup, and therefore has a depth, length, and width to allow the interconnection. In one preferred version of the invention, the width of the channel is equal to or slightly less than that of the rib so that the rib will be frictionally and snugly received within the channel. In one example, the sidewalls of the rib and the channel are each substantially vertical, thereby relying on the snugness of the fit between the rib and the channel to provide a frictional force to hold two measuring devices together. In an alternate version, the rib and the channel are each trapezoidal in cross section. Thus, at a location closest to the lower surface of the handle the rib is somewhat narrower and then the sides of the rib flare outwardly somewhat to form a wider base. Likewise, in such a version, the opening of the channel adjacent the upper surface of the handle is narrower than the bottom surface of the channel, with the sidewalls of the channel flaring outwardly somewhat. By forming the base of the rib so that it is slightly larger than the opening of the channel, an additional force is required to force the rib into or out of the channel. Consequently, once the rib is forced into the channel, a pair of measuring devices will remain connected with one another until a threshold force is applied to urge them apart again.

At one end of the channel, preferably relatively closer to the proximal end of the handle, the channel widens to form a mouth 39 that is larger than the width of the opening of the channel along the rest of the length of the channel. The widened mouth facilitates removal of the first device from the second device. At the opposite distal end 37 of the channel, the channel terminates in a flared termination point without a raised end wall so that the channel fades into the handle with the channel terminating short of the distal end of the handle 30. Similarly, the rib includes a height that is tallest toward the proximal end 49 of the rib and in which the distal end 49 of the rib decreases in height and terminates short of the distal end of the handle 30.

Figure 4:
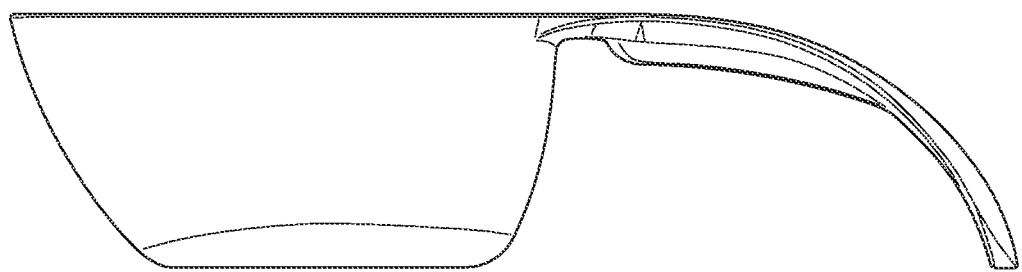
FIG. 4 is a side view of a preferred measuring cup.

As shown in FIG. 4, the handle of the measuring device may curve downwardly in a direction from the rim toward the floor of the vessel as the handle extends laterally away from the proximal end toward the distal end. In other versions, the handle may be generally or completely flat or horizontal.

In some versions of the invention, a set of several measuring devices is provided. Thus, as seen in FIG. 5, a set of five measuring cups is provided together. Each measuring device includes a vessel or cup 10, 40, 50, 60, 70. Each also includes a corresponding handle (e.g., 30, 72). Most preferably, the handle 30 of the largest cup 10 has a sharper angle of curvature than the handle 72 of the smallest cup. This gradual reduction of curvature from the largest to the smallest aids in the nesting of the cups within one another. In addition, the handle lengths, together with the curvature, are preferably formed such that the handle 72 of the smallest cup is the shortest, with the handles within the set becoming progressively longer as the size of the cup increases. The handle 30 for the largest cup 10 is the longest in the preferred version of the invention. As shown in FIG. 5, this progressive curvature and increase in size of the invention allows the handle of each one of the separate cups to have a portion of its upper surface that is not covered by the handle of a cup nested within it. Consequently, intermediate sized cups are readily accessible and separable from the others by quickly grasping the exposed portion of the distal end of the desired cup.

Within a set of measuring devices, the width of the channel and the rib must also increase as the size of the cups progresses in one direction or the other. In the preferred version, the smallest measuring device has a rib and channel that is smaller than that of any of the others, with the largest measuring device having the largest rib and channel. Intermediate devices have ribs and channels that gradually increase in width from the smallest one to the largest one, with each individual rib being sized to be snugly received within the channel of the next-largest measuring device.

The progression in sizes of channels and ribs may be configured in the opposite way in other versions of the invention. Thus, the smallest measuring device may have the largest channel and rib while the largest measuring device having the smallest channel and rib. The intermediate devices then will have channels and ribs that decrease in size from the smallest vessel to the device having the largest vessel.

As noted above, the same principles of the invention may be applied to measuring devices having vessels of any size. Thus, for example, each one of a set of measuring spoons may include a vessel that is smaller than the measuring cups. Most preferably, the measuring spoons have predetermined volumes in fractions or multiples of teaspoons or tablespoons.

The handles of the measuring spoons are formed in accordance with the handles of the measuring cups as described above, each one of the handles having a feature for joining the handle to an adjacent handle of a measuring spoon of a different size. In addition, a set of measuring spoons preferably has handles of varying curvature, with a smallest measuring spoon having a handle that is relatively flatter than the others and a largest measuring spoon having a handle that is relatively more curved than the others.

In the version as shown and described above, the attachment feature is in the form of a rib and a channel, the rib being formed on the lower side and the channel being formed on the upper side of the handle. In other versions of the invention, the rib may extend upwardly from the upper side of the handle, thereby forming a channel within the lower surface of the handle.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A measuring container set, comprising:
   a first measuring container, comprising:
      a measuring vessel having a floor and upwardly extending sidewalls terminating in a rim, the measuring vessel forming an interior volume;
      a handle attached to the measuring vessel at a proximal end of the handle and extending downward and laterally away from the measuring vessel to a distal end of the handle, the handle having a first side and a second side;
      an elongated rib formed on the first side of the handle, the rib having a rib length in the direction from the proximal end of the handle toward the distal end of the handle and a rib width, the rib length being greater than the rib width, the rib length further being between one half and one third of the length from the proximal end to the distal end of the handle, the rib further having a rib height, the rib height being higher adjacent the proximal end of the handle than the rib height adjacent the distal end of the handle; and
      a channel formed on the second side of the handle, the channel having a channel length and a channel width, the channel further terminating in a widened channel mouth at an end of the channel toward the proximal end of the handle;
   wherein the first measuring container is configured to nest with at least one additional measuring container;
   the at least one additional measuring container comprising:
      an additional measuring vessel forming an additional interior volume;
      an additional handle attached to and extending downward and laterally away from the additional measuring vessel, the additional handle having a first side and a second side;
      an additional rib formed on the first side of the additional handle, the additional rib having an additional rib length and an additional rib width, and an additional rib height, the additional rib height being higher adjacent the proximal end of the additional handle than the additional rib height adjacent the distal end of the additional handle;

an additional channel formed on the second side of the additional handle, the additional channel having an additional channel length and an additional channel width, the additional channel further terminating in a widened channel mouth at an end of the additional channel toward the proximal end of the additional handle, the additional channel also terminating in an open end without a raised end wall at an opposing end of the additional channel toward the distal end of the additional handle, wherein the rib is sized and configured to be snugly received within the additional channel;

and further wherein a portion of the distal end of the additional handle extends downward and beyond the distal end of the handle when the measuring container is nested within the additional measuring container.

2. The measuring container of claim 1, wherein the rib has a length extending laterally along the handle and a width transverse to the length, the length being greater than the width.

3. The measuring container of claim 1, wherein the rib is substantially rectangular in cross-section.

4. The measuring container of claim 1, wherein the rib is substantially trapezoidal in cross-section.

5. The measuring container of claim 4, wherein the additional channel is substantially trapezoidal in cross-section.

6. The measuring container of claim 1, wherein at least a portion of the additional handle extends laterally beyond and is not covered by the handle of the measuring container when the measuring container is nested within the additional measuring container.

7. A measuring container set, comprising:

a first measuring container, comprising:

a measuring vessel having a floor and upwardly extending sidewalls terminating in a rim, the measuring vessel forming an interior volume;

an elongated handle having a proximal end and a distal end, the proximal end being attached to the measuring vessel, the handle having a first side, a second side, and a handle length from the proximal end to the distal end;

an elongated rib formed on the first side of the handle, the rib having a rib length and a rib width, the rib length being in the direction from the proximal end of the handle toward the distal end of the handle, the rib length further being greater than the rib width, the rib further terminating at a location spaced apart from the distal end of the handle and between the proximal end and the distal end of the handle, the rib further having a rib height, the rib height decreasing as it extends toward the distal end of the handle; and a channel formed on the second side of the handle, the channel having a channel length and a channel width, the channel widening to form a channel mouth at a first end of the channel positioned adjacent the rim of the vessel, the channel further having a depth that is increasingly shallow at an opposing second end of the channel, the second end of the channel terminating at a location spaced apart from the distal end of the elongated handle;

wherein the first measuring container is configured to nest with at least one additional measuring container;

the at least one additional measuring container comprising:

an additional measuring vessel forming an additional interior volume;

an additional handle attached to and extending laterally away from the additional measuring vessel, the additional handle having a first side and a second side;

an additional rib formed on the first side of the additional handle, the additional rib having an additional rib length and an additional rib width;

an additional channel formed on the second side of the additional handle, the additional channel having an additional channel length and an additional channel width, the additional channel further widening to form a channel mouth at a first end of the additional channel;

wherein the rib is sized and configured to be snugly received within the additional channel.

8. The measuring container set of claim 7, wherein the first channel width is greater than the additional channel width.

9. The measuring container set of claim 7, wherein the first rib width is greater than the additional rib width.

10. The measuring container of claim 7, wherein:

the handle of the first measuring container curves downward as it extends laterally away from the measuring vessel, the rib having a rib height wherein the rib height is shortest at an intermediate location along the handle; and the additional handle of the additional measuring container curves downward as it extends laterally away from the additional measuring vessel, the additional rib having an additional rib height wherein the additional rib height is shortest at an intermediate location along the additional handle.

11. The measuring container set of claim 7, wherein the second end of the channel terminates in an open end without a raised end wall.

* * * * *